United States Patent [19]

Sikonia et al.

[11] Patent Number: 4,498,973
[45] Date of Patent: Feb. 12, 1985

[54] MULTIPLE-STAGE CATALYTIC REFORMING WITH GRAVITY-FLOWING DISSIMILAR CATALYST PARTICLES

[75] Inventors: John G. Sikonia, La Grange; Richard W. Bennett, Western Springs, both of Ill.

[73] Assignee: UOP Inc., Des Plaines, Ill.

[21] Appl. No.: 505,559

[22] Filed: Jun. 17, 1983

[51] Int. Cl.³ .............................................. C10G 35/08
[52] U.S. Cl. ........................................ 208/63; 208/64; 208/65; 208/140
[58] Field of Search ...................... 208/65, 140, 63, 64

[56] References Cited

U.S. PATENT DOCUMENTS

| | | | |
|---|---|---|---|
| 3,470,090 | 9/1969 | Carson | 208/138 |
| 3,647,680 | 3/1972 | Greenwood et al. | 208/65 |
| 3,692,496 | 9/1972 | Greenwood et al. | 23/288 G |
| 3,706,536 | 12/1972 | Greenwood et al. | 23/288 G |
| 3,725,248 | 4/1973 | Greenwood et al. | 208/138 |
| 3,725,249 | 4/1973 | Vesely et al. | 208/139 |
| 3,839,196 | 10/1974 | Plackmann et al. | 208/174 |
| 3,839,197 | 10/1974 | Greenwood et al. | 208/174 |
| 3,864,240 | 2/1975 | Stone | 208/64 |
| 3,981,824 | 9/1976 | Greenwood et al. | 252/415 |
| 4,167,473 | 9/1979 | Sikonia | 208/140 |
| 4,167,474 | 9/1979 | Sikonia | 208/140 |

*Primary Examiner*—Curtis R. Davis
*Attorney, Agent, or Firm*—James R. Hoatson, Jr.; John F. Spears, Jr.; William H. Page, II

[57] ABSTRACT

A multiple-stage catalytic conversion system in which a hydrocarbonaceous charge stock and hydrogen flow serially through a plurality of catalytic reaction zones in each of which the catalyst particles are movable via gravity flow. Dissimilar catalyst particles are utilized in the reactor systems which share a common regenerating tower through which the catalyst particles are downwardly movable via gravity flow and in which the catalyst particles are regenerated in segregated fashion. Dissimilarity of the catalyst particles stems from a difference in activity, stability and selectivity characteristics. In turn, this difference may be attributed either to physical, or chemical distinctions between the two composites, or both.

17 Claims, 3 Drawing Figures

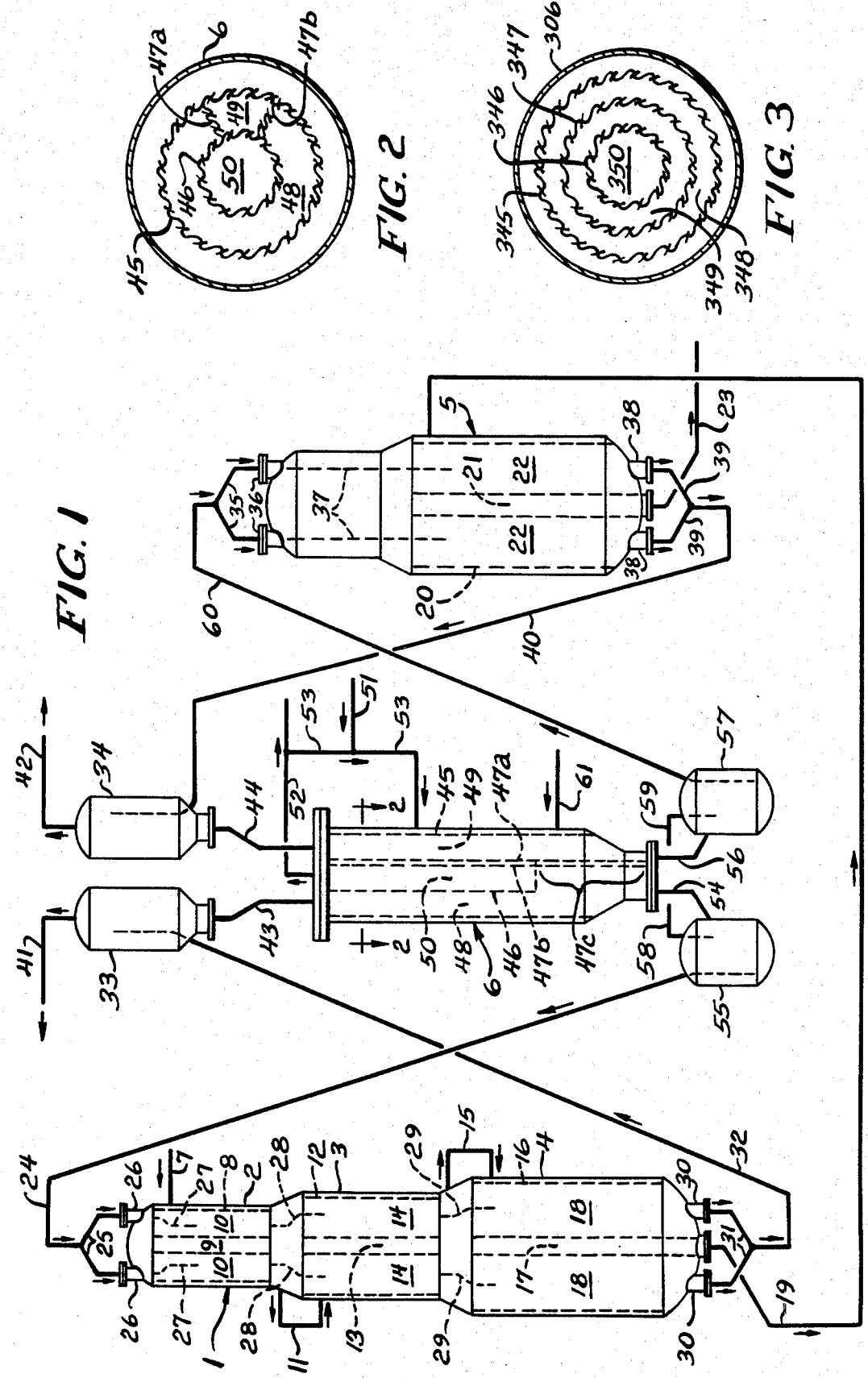

MULTIPLE-STAGE CATALYTIC REFORMING WITH GRAVITY-FLOWING DISSIMILAR CATALYST PARTICLES

BACKGROUND OF THE INVENTION

The present invention is directed toward an improved technique for effecting the catalytic conversion of a hydrocarbonaceous reactant stream in a multiple-stage reaction system wherein (i) the reactant stream flows serially through the plurality of reaction zones and, (ii) the catalyst particles are movable through each reaction zone via gravity-flow. More particularly, the described technique is adaptable for utilization in vapor-phase systems wherein the conversion reactions are principally endothermic, and where the flow of the hydrocarbonaceous reactant stream, with respect to the downward direction of catalyst particle movement, is cocurrent and essentially radial.

Various types of multiple-stage reaction systems have found widespread utilization throughout the petroleum and petrochemical industries for effecting multitudinous reactions, especially hydrocarbon conversion reactions. Such reactions are either exothermic, or endothermic, and encompass both hydrogen-producing and hydrogen-consuming processes. Multiple-stage reaction systems generally take one of two forms: (1) side-by-side configuration with intermediate heating between the reaction zones, and wherein the reactant stream or mixture flows serially from one zone to another zone; and, (2) a stacked design wherein a single reaction chamber, or more, contains the multiple catalytic contact stages. Such reactor systems, as applied to petroleum refining, have been employed to effect numerous hydrocarbon conversion reactions including those which predominate in catalytic reforming, alkylation, ethylbenzene dehydrogenation to produce styrene, other dehydrogenation processes, etc. Our invention is capable of utilization in those processes where the conversion reactions are effected in vapor-phase and catalyst particles are movable via gravity-flow, and where the reaction system exists in side-by-side relation, where two or more reaction zones are vertically aligned, where one or more additional reaction zones, either in side-by-side or vertically aligned configuration, are disposed in a side-by-side relationship with two or more vertically aligned reaction zones, or where all reaction zones are in side-by-side relation.

Since catalyst particles which are movable through a reaction system by way of gravity-flow are necessarily moving in a downward direction, the present technique contemplates the withdrawal of catalyst particles from a bottom portion of one reaction zone and the introduction of fresh, or regenerated catalyst particles into the top portion of the same or a second reaction zone. The present technique is also intended to be applied to those reaction systems wherein the catalyst is disposed as an annular bed and the flow of the reactant stream across the bed is radial.

A radial-flow reaction system generally consists of tubular-form sections, having varying nominal cross-sectional areas, vertically and coaxially disposed to form the reaction vessel. Briefly, the system comprises a reaction chamber containing a coaxially disposed catalyst-retaining screen, said screen having a nominal, internal cross-sectional area less than said chamber, and a perforated centerpipe having a nominal, internal cross-sectional area which is less than the catalyst-retaining screen. The reactant stream may be introduced, in vapor-phase, into the annular-form space created between the inside wall of the chamber and the outside surface of the catalyst-retaining screen. The latter forms an annular-form, catalyst-holding zone with the outside surface of the perforated centerpipe; vaporous reactant flows laterally and radially inward through the screen and catalyst zone into the centerpipe and out of the reaction chamber. Alternatively the reactant stream may be introduced into the perforated centerpipe where it flows laterally and radially outward through the centerpipe, catalyst zone and catalyst-retaining screen and into the annular-form space created between the inside wall of the chamber and the outside surface of the catalyst-retaining screen where it leaves the reaction chamber. Although the tubular-form configuration of the various reactor components may take any suitable shape—e.g. triangular, square, oblong, diamond, etc., many design, fabrication and technical considerations dictate the advantages of using components which are substantially circular in cross-section and one such particularly preferred configuration comprises a group of scalloped-shaped elements fabricated into a circular-form screen as disclosed in U.S. Pat. No. 2,683,654.

Illustrative of a multiple-stage stacked reactor system, having gravity-flowing catalyst particles, and to which the present invention is particularly adaptable, is that shown in U.S. Pat. No. 3,706,536. Transfer of the gravity-flowing catalyst particles, from one reaction zone to another, as well as introduction of fresh catalyst particles and withdrawal of "spent" catalyst particles, is effected through the utilization of a plurality of catalyst-transfer conduits. Deactivated catalyst particles are withdrawn from the last reaction zone and transferred to a regenerating tower through which they are also downwardly movable via gravity-flow.

It is to such systems, as well as those hereafter discussed as being illustrative of the current known state of the art, that the present invention is intended to be most appropriately applicable. Briefly, our inventive concept encompasses a process wherein two separate reactor systems, each of which contains from one to three individual reaction zones, share a common catalyst regenerating tower. Each system contains a different catalytic composite having different activity, stability and/or selectivity characteristics than the composite in the other system. More specifically, the process herein described is of special advantage when utilized in the catalytic reforming of a hydrocarbonaceous charge stock for the production of high yields of a high octane blending value normally liquid product.

OBJECTS AND EMBODIMENTS

A principal object of our invention is to afford an improved technique for the catalytic conversion of hydrocarbons and in particular for the catalytic reforming of a hydrocarbon charge stock. A corollary objective is to increase the conversion process operating efficiency while simultaneously increasing the effective utilization of the catalytic composite employed therein.

Other objects in applying the invention to catalytic reforming involve increased yields of normally liquid product—i.e. pentanes and heavier hydrocarbons—and hydrogen, the latter having increased purity which enhances its use for recycle purposes.

Accordingly, a broad embodiment of the present invention is directed toward a process for the catalytic conversion of a hydrocarbonaceous charge stock, wherein said charge stock is contacted with at least two discrete catalytic composite entities comprising the steps of contacting said charge stock with a first of said catalytic composite entities at hydrocarbon conversion conditions in a reactor system in which the first catalytic composite entity is downwardly movable via gravity flow to form a first reactor system effluent stream; serially contacting at hydrocarbon conversion conditions said first reactor stream effluent with at least one other of said catalytic composite entities, each displaced within separate reactor systems in which said catalytic composite entities are downwardly movable via gravity flow; at least periodically withdrawing deactivated catalytic composite entities from the reactor systems and passing them in segregated fashion to a common regenerator through which said deactivated catalytic composite entities are downwardly movable via gravity flow; regenerating in segregated fashion the deactivated catalytic composite entities at regeneration conditions; and withdrawing regenerated discrete catalytic composite entities from the regenerator in segregated fashion and at least periodically returning the regenerated discrete catalytic composite entities to their respective reactor systems.

In an alternative and more specific embodiment, the present invention provides a process for catalytically reforming a hydrocarbon charge stock wherein said charge stock is contacted with two discrete catalytic composite entities comprising the steps of contacting said charge stock with a first of the discrete catalytic composite entities at reforming conditions including the presence of hydrogen in a first reactor system in which the first discrete catalytic composite entity is downwardly movable via gravity flow to form a first reactor system effluent stream; contacting said first reactor effluent stream with a second of the discrete catalytic composite entities at reforming conditions including the presence of hydrogen in a second reactor system in which the second discrete catalytic composite entity is downwardly movable via gravity flow; at least periodically withdrawing deactivated first and second discrete catalytic composite entities from the first and second reactor systems respectively and passing them in segregated fashion to a common regenerator through which said deactivated first and second discrete catalytic composite entities are downwardly movable via gravity flow; regenerating in segregated fashion the deactivated first and second discrete catalytic composite entities; and withdrawing regenerated first and second discrete catalytic composite entities from the regenerator in segregated fashion and at least periodically returning the regenerated discrete catalytic composite entities to the first and second reactor system, respectively.

These, as well as other objects and embodiments will become evident from the following, more detailed description of the present hydrocarbon conversion process.

INFORMATION DISCLOSURE

It must be recognized that various types of hydrocarbon conversion processes are known which utilize multiple-stage reactor systems, either in a side-by-side configuration, in a vertically-disposed stack arrangement, or in a combination of a stacked system in side-by-side relation with one or more separate reaction zones. As applied to petroleum refining, such systems may be employed in a wide variety of hydrocarbon conversion reactions. While adaptable to many conversion reactions and processes through use of a reactor system in which catalyst particles are movable via gravity-flow, the present invention will be further described in conjunction with the well known endothermic catalytic reforming process. However, reference to the catalytic reforming process should not be interpreted as limiting the broad application of the present invention.

Historically, catalytic reforming was effected in a non-regenerative, fixed-bed system comprising a plurality of reaction zones disposed in side-by-side relation. When the catalytic composite had become deactivated to the extent that continuous operation was no longer economically feasible, the entire unit was shut down and the catalyst regenerated in situ. A marked improvement over simple in situ regeneration resulted from the use of the so-called "swing bed" system in which an extra reactor was substituted for one which was due to be placed off-stream for regeneration purposes. Still more recently, multiple-stage reactor systems have been provided in which the catalyst particles flow, via gravity, through each reaction zone thereby enabling the catalyst to be removed from the reaction zone for regeneration. In a specific embodiment of such a process, the so-called "stacked" system, the catalyst particles flow downwardly from one catalyst-containing zone to another, and are ultimately transferred to a suitable regeneration system which, preferably, also functions with a downwardly moving bed of catalyst particles. In effect, the catalyst particles are transported from one reaction zone to another in such a manner that the flow of catalyst particles is substantially continuous, at frequent intervals, or at extended intervals, with movement of the catalyst being controlled by the rate of catalyst withdrawal from the last of the series of individual reaction zones.

U.S. Pat. No. 3,470,090, issued Sept. 30, 1969, illustrates a multiple-stage, side-by-side reaction system with intermediate heating of the reactant stream which flows serially through the individual reaction zones. Catalyst particles withdrawn from any one of the reaction zones are transported to suitable regeneration facilities. This type of system can be modified so that the catalyst particles withdrawn from a given reaction zone are transported to the next succeeding reaction zone, while the catalyst withdrawn from the last reaction zone may be transported to suitable regeneration facilities. The necessary modifications may be made in accordance with the teachings in U.S. Pat. No. 3,839,197, issued Oct. 1, 1974, which discloses an inter-reactor catalyst transport method. Catalyst transfer from the last reaction zone in a system comprising a plurality of such zones to the top of the catalyst regeneration zone may be effected through the use of the technique illustrated in U.S. Pat. No. 3,839,196, issued Oct. 1, 1974.

A stacked reaction zone configuration is shown in U.S. Pat. No. 3,647,680, issued Mar. 7, 1972, comprising a two-stage system having an integrated regeneration facility which receives catalyst withdrawn from the bottom reaction zone. Other stacked configurations are illustrated in U.S. Pat. No. 3,692,496, issued Sept. 19, 1972, and U.S. Pat. No. 3,725,249, issued Apr. 3, 1973.

U.S. Pat. No. 3,725,248, issued Apr. 3, 1973, illustrates a multiple reaction zone system in side-by-side configuration with gravity-flowing catalyst particles being transported from the bottom of one reaction zone to the top of the next succeeding reaction zone. Those catalyst particles being removed from the last reaction zone are transferred to suitable reqeneration facilities.

As hereinbefore stated, general details of a three-reaction zone, stacked system are presented in U.S. Pat. No. 3,706,536, issued Dec. 19, 1972. This reference illustrates one type of multiple-stage system to which the present inventive concept is applicable. As generally practiced in a catalytic reforming unit, each succeeding reaction zone contains a greater volume of catalyst. Accordingly, the annular-form catalyst-holding volume of each succeeding reaction zone is greater in cross-sectional area than the preceding zone.

These illustrations are believed to be fairly representative of the art which has been developed in multiple reaction zone conversion systems wherein catalyst particles are movable through each zone via gravity-flow.

U.S. Pat. No. 3,981,824, issued Sept. 21, 1976, is directed specifically toward a regeneration method for gravity-flowing catalyst particles which comprise a Group VIII noble metal component and a halogen component composited with a suitable refractory inorganic oxide—e.g. gamma alumina. This particular method, as well as others, may be used in the present invention.

U.S. Pat. No. 3,864,240, issued Feb. 4, 1975, is illustrative of the integration of a reaction system having gravity-flowing catalyst particles with a fixed-bed system. The teachings in this reference enable the revamping of an existing three-reaction zone, fixed-bed system to conform to the integrated system disclosed. One of the advantages derived from the invention of the reference is that it enables a refiner to adjust the process product by having a mordenite-containing composite in the gravity-flowing zone as contrasted to a principally alumina catalyst in the plurality of fixed-bed reaction zones. However, there is no disclosure of a process which utilizes catalytic composites having different activity and stability characteristics in an all gravity-flowing catalyst system. Furthermore, there is no disclosure of effecting the difference in activity and stability characteristics through changes in active metal component concentration and/or kind, or in changes with respect to halogen content of the catalytic composites.

U.S. Pat. No. 4,167,473, issued Sept. 11, 1979, discloses a multiple-stage catalytic conversion system utilizing two distinct catalytic composites which differ from one another in activity and stability characteristics as a result of changes in active metal component concentration and/or kind, or in changes with respect to halogen content of the composites. However, the process of this reference requires the use of separate regenerating towers and accordingly requires greater capital expenditure coupled with increased operating difficulty. U.S. Pat. No. 4,167,474, issued Sept. 11, 1979, discloses a process which overcomes the disadvantage of utilizing two separate regenerating towers. This reference discloses a multiple-stage catalytic conversion system utilizing two distinct catalytic composites which employs only a single regeneration tower. The distinct catalysts are commingled, regenerated and then separated each being returned to its respective reactor system. Because the catalysts are regenerated while commingled, it is necessary to employ a means of separating the catalysts once regenerated. Accordingly, the reference teaches that the distinct catalysts may each have differing particle diameters which, when employed with a means of separation based on the diameter difference, allows separation of the catalysts upon completion of regeneration. An alternative method disclosed is the use of a magnetic separator. Thus while U.S. Pat. No. 4,167,474 discloses a method which obviates the use of two separate regeneration towers, the process disclosed therein still requires complex means for separating the distinct catalysts, employing either magnetic separation or catalysts having different particle diameters. The use of magnetic separation is disadvantageous because it requires incorporation of magnetic substances into the catalyst particles themselves. Such substances may well affect the catalytic activity, and/or stability. Alternatively the use of catalyst particles of different diameters also presents the further disadvantages of requiring non-uniform catalyst manufacturing facilities to produce two distinct particle diameters and increased difficulty in promoting uniform flow of catalyst through the regenerator.

In brief summation, the prior art directed toward catalytic conversion systems in which all the catalyst particles are movable via gravity-flow, is not cognizant of the technique herein described wherein two separate systems utilize composites having different degrees of activity and stability, and undergo regeneration in segregated fashion in a common regenerating tower.

SUMMARY OF THE INVENTION

To reiterate briefly, the process encompassed by our inventive concept is suitable for use in hydrocarbon conversion systems which are characterized as multiple reaction zone and in which catalyst particles are movable via gravity-flow through each zone. Moreover, the present invention may be advantageously utilized in reactor systems where the principal reactions are endothermic and are effected in vapor-phase. Although the following discussion is specifically directed toward catalytic reforming of naphtha boiling range fractions, there is no intent to so limit the present invention.

Catalytic reforming, as well as many other processes, has experienced several phases of development currently terminating in the system in which the catalyst beds assume the form of a descending column in one or more reaction vessels. Typically, the catalysts are utilized in spherical form having a substantially uniform nominal diameter of from about 1/32-inch to about 5/32-inch in order to offer free-flow characteristics which will neither bridge, nor block the descending column, or columns of catalyst within the overall reactor and regenerator system.

In one such multiple-stage system, the reaction chambers are vertically stacked, and a plurality (generally from about 6 to about 16) of relatively small diameter conduits are employed to transfer catalyst particles from one reaction zone to the next lower reaction zone (via gravity-flow) and ultimately to withdraw catalyst particles from the last reaction zone. The latter are usually transported to the top of a catalyst regeneration facility, also functioning with a descending column of catalyst particles; regenerated catalyst particles are then transported to the top of the upper reaction zone of the stack. In order to facilitate and enhance gravity-flow within each reaction vessel, as well as from one zone to another, it is particularly important that the catalyst particles have a relatively small substantially uniform nominal diameter, and one which is preferably less than about 5/32-inch. In a conversion system having individual reaction zones in side-by-side relationship, catalyst transport vessels (of the type shown in U.S. Pat. No. b 3,839,197) are employed in transferring catalyst particles from the bottom of one zone to the top of the succeeding zone, and from the last reaction zone to the top of the regeneration facility.

Catalytic reforming of naphtha boiling range hydrocarbons, a vapor-phase operation, is effected at conversion conditions which include catalyst bed temperatures in the range of about 700° to about 1020° F.; judicious and cautious techniques generally dictate that catalyst temperatures not substantially exceed a level of about 1020° F. Other conditions generally include a pressure from about 50 to about 1000 psig, a liquid hourly space velocity (defined as volumes of fresh charge stock per hour, per volume of catalyst particles in the reaction zone) of from 0.2 to about 10 hr.$^{-1}$ and a hydrogen to hydrocarbon mole ratio generally in the range of about 0.5:1 to about 10:1. As those possessing the requisite skill in the petroleum refining art are aware, the described continuous regenerative reforming system offers numerous advantages when compared to the prior art fixed bed system. Among these is the capability of efficient operation at comparatively lower pressures— e.g. 50 to about 200 psig—and higher liquid hourly space velocities—e.g. about 3 to about 10 hr.$^{-1}$. As a result of continuous catalyst regeneration, higher consistent inlet catalyst bed temperatures can be maintained —e.g. 950° to about 1010° F. Furthermore, there is afforded a corresponding increase in both hydrogen production and hydrogen purity in the recycled vaporous phase from the product separation facility and an increase in $C_5$+hydrocarbon yield.

Catalytic reforming reactions are multifarious, and include dehydrogenation of naphthenes to aromatics, the dehydrocyclization of paraffins to aromatics, the hydrocracking of long-chain paraffins into lower-boiling normally liquid material and, to a certain extent, the isomerization of paraffins. These reactions, the net result of which is endothermic, are effected through the utilization of one or more Group VIII noble metals (e.g. platinum, osmium, iridium, rhodium, ruthenium, palladium) combined with a halogen (e.g. chlorine and/or fluorine) and a porous carrier material such as alumina. Recent investigations have indicated that additional advantageous results are attainable and enjoyed through the cojoint use of a catalytic modifier; these are generally selected from the group of iron, cobalt, copper, nickel, gallium, zinc, germanium, tin, cadmium, rhenium, bismuth, vanadium, alkali and alkaline earth metals, and mixtures thereof. Regardless of the selected catalytic composite, the ability to attain the advantage over the common fixed bed systems is greatly dependent upon achieving acceptable catalyst flow downwardly through the reactor system and through the regenerating tower.

Catalytic reforming is a well known process which has been thoroughly described in the literature, having been a commercially important tool of the petroleum refining industry for about three decades. One of the many things gleaned from the vast amount of catalytic reforming experience, and resulting knowledge, is the soundness of utilizing multiple stages or reaction zones, each of which contains a different quantity of catalyst, generally expressed as volume percent of the total catalyst within the reaction zone. The reactant stream, hydrogen and the hydrocarbon feed flow serially through the reaction zones in order of increasing catalyst volume with, of course, interstage heating. In a three-reaction zone system, typical catalyst loadings expressed in volume percent and based on the volume of catalyst in the reaction zones are: first, 10% to about 30%; second, from about 20% to about 40%; and, third, from about 40% to about 60%. With respect to a four-reaction zone system, suitable volume percent catalyst loadings would be: first, 5% to about 15%; second, 15% to about 25%; third, 25% to about 35%; and, fourth, 35% to about 50%. Unequal catalyst distribution, increasing in the serial direction of reactant stream flow, facilitates and enhances the distribution of the reactions.

Catalytic composites known and described in the applicable prior art may be utilized in the process encompassed by the present invention. Essential, however, to our invention is the utilization of at least two discrete catalytic composite entities which may comprise dissimilar catalysts and which may be characterized as possessing different combined activity, stability and/or selectivity (A/S/SE) characteristics. For the purposes of further explanation of the invention as applied to catalytic reforming, it is believed that several definitions are warranted. As employed herein with reference to catalytic reforming, "activity" is defined as the level of operating severity required to attain a given product quality such as octane rating, aromatics concentration, etc. with respect to the normally liquid reformed product effluent—i.e. pentanes and heavier hydrocarbons. As an example, considering a final product having a clear research octane rating of 100.0, with all variables excepting catalyst bed temperature being constant, a catalyst producing the indicated product at 945° F. (507° C.) is more active than one which requires a temperature of 965° F. (518° C.). Likewise, where catalyst bed temperature is maintained constant and liquid hourly space velocity (LHSV) is adjusted to attain the target octane rating, a catalyst which produces the desired octane rating at 2.0 hr.$^{-1}$ LHSV is more active than one requiring 1.75 hr.$^{-1}$ LHSV to reach the target rating.

Catalyst "stability" as applied to catalytic reforming is herein defined as the rate of change in activity relative to catalyst life measured as barrels of charge stock per pound (BPP) of catalyst disposed within the reaction zone. Among those versed in catalytic reforming catalysts, stability is most often expressed in units of temperature increase per unit of catalyst life to maintain a constant target octane rating with respect to the normally liquid product effluent—this is commonly stated as °F/BPP. Thus, a reforming catalyst having a deactivation rate of 2.5° F/BPP is significantly more stable than one which deactivates at a rate of 8.0° F/BPP. Another characteristic utilized in selecting the catalytic composites is catalyst "selectivity" which is the ability of the catalyst to produce a particular product and for purposes of catalytic reforming, it may be defined as (1) the yield of pentanes and heavier product and, (2) the purity of hydrogen in the gaseous products. With respect to the latter, calculations are generally based upon the total quantity of butanes and lighter vaporous material.

Reforming catalytic composites are unique in that they possess dual functionality; although this may be defined in a number of ways, the most common is that such catalysts simultaneously exhibit acidic properties as well as metallic hydrogenation/dehydrogenation functionality. Dissimilarity of the catalysts employed in the present processing technique may be primarily achieved by varying the dual-function character of the composites. As above set forth, and as an example of one possible situation, the catalytic composites may have the same selectivity, but exhibit different combined activity and stability characteristics. In explanation, it will be presumed that a wide spectrum of reforming catalytic composites are subjected to activity and stability performance tests, and are rated, in comparison to a standard catalyst, and to each other on a basis of one through ten, the latter representing highest activity and greatest stability. In accordance with this arbitrarily selected scale, where catalyst "A" has an activity rating of 5 and a stability rating of 10, while catalyst "B" has an activity rating of 10 and exhibits a stability rating of 5, the catalysts have different combined activity and stability characteristics. Likewise, where both composites have an activity rating of 8, and one a stability rating of 8, while the second has a stability rating of 3, they have different combined activity and stability characteristics and are therefore discrete catalytic composite entities for the purposes of the present invention.

Reforming catalysts, as hereinbefore stated, comprise at least one Group VIII noble metal component, platinum, palladium, rhodium, ruthenium, osmium and/or iridium, and an acid-acting halogen component, generally chlorine, fluorine, or both. These are composited, during the manufacturing technique, with a refractory inorganic oxide from the group of alumina, silica, zirconia, strontia, magnesia, hafnia and mixtures thereof, etc. Catalytic modifiers, of the type previously described, are often combined therewith for the purpose of adjusting the activity/stability relationship. Catalytic attenuators, selected from alkali and alkaline earth metals are employed at times where charge stock characteristics so dictate. The Group VIII noble metal component, or components, may be present in an amount of about 0.1% to about 2.0% by weight, calculated on an elemental basis. Excellent results are achievable when the catalyst contains about 0.3% to about 0.9% by weight of the Group VIII noble metal component, or components. Halogen may be composited with the carrier material during impregnation of the latter with the active metallic components. The quantity of halogen, whether chlorine, fluorine, or both, is such that the final catalytic composite contains about 0.1% to about 1.5% by weight, and most generally from about 0.3% to about 1.2%, calculated on an elemental basis. With respect to the metallic catalytic modifiers, they are preferably present in an amount in the range of about 0.1% to about 5.0% by weight, again on an elemental basis. Regardless of the absolute quantities or character of these catalytic modifiers, the atomic ratio of the Group VIII noble metal to the catalytic modifier in the catalyst is preferably selected from the range of 0.1:1.0 to about 3.0:1.0, with excellent results being attainable at an atomic ratio of about 0.5:1.0 to about 1.5:1.0.

In particular reforming applications, with certain naphtha boiling range feedstocks, it may be desirable to attenuate the acid function of the selected catalytic composite. This may be accomplished through the addition of an alkali and/or alkaline earth metal component in the amount of from about 0.01% to about 1.5% by weight. This component is generally selected from the group of lithium, sodium, potassium, rubidium, cesium, barium, strontium, calcium, magnesium, beryllium, mixtures of two or more, etc. Reforming catalytic composites, following preparation and calcination thereof, are subjected to a substantially water-free reduction in hydrogen. Reduction may be conveniently performed in situ as an integral step of a start-up sequence provided precautions are observed to pre-dry the system to a substantially water-free state. Catalytic reforming processes may be improved when the reduced composite is subjected to a presulfiding operation to incorporate from about 0.05% to about 0.5% by weight of sulfur, on an elemental basis.

The difference in activity, stability and selectivity characteristics of the discrete catalytic composite entities can be achieved through changes in physical properties, chemical properties, or both. The former would include apparent bulk density, pore diameter (nominal) and surface area as generally measured in square meters per gram of catalyst. Changes in chemical composition offer a wider variety of activity, stability and/or selectivity characteristics and are, therefore, to be preferred. Thus in reference to the invention as applied to catalytic reforming, the refractory inorganic oxide carrier, alumina in and of itself, compared to a carrier containing about 20.0% by weight of silica, will exhibit different activity, stability and selectivity, notwithstanding the same Group VIII noble metal and halogen concentration. In the interest of both brevity and clarity, the following discussion will be limited to reforming catalysts utilizing an all-alumina carrier and chlorine as the halogen component. It is understood that the present invention has application to other catalytic processes and there is no intent to so limit the present invention.

Where the reforming catalytic composites both contain platinum as the Group VIII metallic component, the difference in combined activity, stability and selectivity (A/S/SE) characteristics can be achieved simply by varying the concentration of the platinum. Thus, a composite of alumina, 0.9% chlorine and 0.75% by weight of platinum, will have different combined A/S/SE characteristics than one of alumina, 0.9% chlorine and 0.375% platinum. Similarly, a platinum/alumina catalyst containing 1.0% by weight of chlorine will have a different A/S/SE characteristic than one which is substantially free from chlorine. On the other hand, the chlorine concentrations may be varied to effect the change in A/S/SE characteristics. Additionally, one catalyst may contain platinum as the sole Group VIII metallic component, while the second may contain both platinum and iridium. Bi-metallic composites will differ from mono-metallic composites, as will tri-metallic and tetra-metallic composites.

Likewise, a reforming catalyst containing platinum, vanadium and chlorine composited with alumina, will be different in A/S/SE characteristics than the same catalyst without vanadium. A platinum/alumina/chlorine catalyst will exhibit different characteristics than a palladium/alumina/chlorine catalyst. Where the catalytic composite contains the same Group VIII component, and the same concentration of chlorine, the difference can be attained through the use of the same catalytic modifier in different concentrations. Whether a calcined and reduced catalyst is subjected to a sulfiding technique prior to use will also affect its A/S/SE characteristics, as will a different concentration of sulfur where the other components and concentrations are identical.

Other changes in the chemical make-up of the discrete catalytic composite entities for use herein, to achieve different A/S/SE characteristics, will become evident to those possessing the requisite skill in the catalytic hydrocarbon conversion process art. It is understood that no particular technique is essential to the method of the present invention, only that the activity, stability and/or selectivity characteristics, however analytically determined, be different.

Briefly, the present invention utilizes at least two separate reactor systems, through each of which the catalyst particles are movable downwardly via gravity-flow, and a common regenerating tower, through which the catalyst particles are also downwardly movable in segregated fashion via gravity-flow. Each reactor system contains a catalyst which exhibits different activity, stability and/or selectivity characteristics than that catalyst disposed in the other reactor systems. Catalyst particles are at least periodically withdrawn from each of the reactor systems and introduced into a common regenerating tower. As applied to catalytic reforming, regeneration is effected by maintaining the deactivated particles segregated and contacting them with air, halogen and steam, followed by a drying operation in substantially moisture-free air. The reforming catalyst particles may be subjected to a reduction technique either in a separate vessel, or in individual vessels integral with the individual reactor systems. Regardless, the regenerated reforming catalysts are then at least periodically introduced into their respective individual reactor systems. The precise technique employed for catalyst regeneration and reconditioning (halogen readjustment) is not an essential feature of our invention and will depend on the exact catalysts utilized. Any of the prior art methods which typically employ combinations of air, recycled combustion flue gas, steam, etc. may be utilized.

With respect to processes employing two discrete catalytic composite entities and therefore comprising two reactor systems, each reactor system will comprise at least one reaction zone. Many varied configurations are made possible by virtue of the present invention. For instance, one system may contain two or three individual reaction zones while the second system consists of one or two individual zones. As previously set forth, in catalytic reforming, the reaction zones generally contain varying quantities of catalyst, usually increasing in the direction of reactant stream flow. Being overall an endothermic process, catalytic reforming requires interstage heating; therefore, the precise number of individual reaction zones, as well as catalyst distribution, will depend primarily upon the physical and chemical characteristics of the fresh feed charge stock and the final estimates relative to distribution of the reactions and overall heat of reaction. As hereinbefore stated, catalytic reforming involves four principal reactions, the overall result of which is temperature decrease, or endothermic. Considering, for the sake of illustration, a four-reaction zone system having a catalyst distribution of 10.0%, 15.0%, 25.0% and 50.0%, the initial reaction zone serves to dehydrogenate substantially all the naphthenic hydrocarbons to form aromatics, a highly endothermic reaction. In the second reaction zone, following inter-heating to raise the temperature of the first zone effluent, the remaining naphthenes are dehydrogenated, and dehydrocyclization of paraffins to produce aromatics is effected, also an endothermic reaction; the latter takes place in the third reaction zone in addition to isomerization of normal paraffins to their isomeric counterparts. Some isomerization takes place in the fourth reaction zone along with the hydrocracking of long-chain paraffins into lower molecular weight, normally liquid paraffins. The present inventive concept, employing two discrete catalytic composite entities, when utilized in conjunction with continuous catalyst regeneration and applied to catalytic reforming, further enhances the many advantages of the latter and affords a process tailor-made to the charge stock characteristics and desired results.

BRIEF DESCRIPTION OF THE DRAWING

In further describing the present inventive concept, reference will be made to the accompanying drawing which serves to illustrate one or more embodiments thereof. Although the drawing depicts a catalytic reforming process, as previously indicated there is no intent to so limit the present inventive concept which has broad application to hydrocarbon conversion processes.

FIG. 1 depicts a simplified schematic flow diagram of a catalytic reforming process in accordance with the present invention in which only principal pieces of equipment are shown. These are: a three reaction zone, stacked reactor system 1; regenerating tower 6, complete with catalyst-fine disengaging hoppers 33 and 34; two lift engagers 55 and 57; and, a second reactor system 5 comprising a single reaction zone.

FIG. 2 represents a cross sectional view of regenerating tower 6 looking down from above. Catalyst retaining screens 45, 46, 47a and 47b serve to define catalyst retaining subvolumes 48 and 49. Catalyst subvolumes 48 and 49 enable the discrete catalytic composite entities to be regenerated in segregated fashion.

FIG. 3 represents an alternative to the catalyst retaining screen configuration depicted in FIG. 2. In this alternative, catalyst retaining screens 345, 346 and 347 are concentrically arranged to define catalyst retaining subvolumes 348 and 349. Details such as pumps and compressors, heaters and coolers, condensers, heat exchangers and heat recovery circuits, start-up lines, valving, and similar hardware have been omitted as being non-essential to a clear understanding of the techniques involved. The utilization of these miscellaneous appurtenances, to modify the illustrated process, is well within the purview of one skilled in the art, and will not remove the resulting process beyond the scope and spirit of the appended claims.

DETAILED DESCRIPTION OF THE DRAWING

Specifically referring now to the drawing, stacked reactor system 1 is shown as having three individual reaction zones 2, 3 and 4 having disposed therein a first discrete catalytic composite entity of gamma alumina, 0.95% by weight of combined chlorine and about 0.75% by weight of platinum. On the arbitrarily selected basis of one through ten, this catalyst has an activity rating of about 8 and a stability rating of about 6. A dissimilar second discrete catalytic composite entity of gamma alumina, 0.95% by weight of combined chlorine and 0.375% by weight of platinum, and presulfided to a sulfur level of 0.25% by weight, is disposed in reactor system 5; this catalyst exhibits an activity rating of 4 and a stability rating of about 9. Both catalysts exhibit a high selectivity for producing aromatics and concomitantly hydrogen. The catalyst disposed in stacked reaction system 1 should desirably exhibit a selectivity for dehydrogenation of naphthenes to aromatics while the catalyst in reactor system 5 should advantageously exhibit a selectivity for isomerization of paraffins to naphthenes with subsequent dehydrogenation of the naphthenes so formed to aromatics. Thus, in this illustration, the fresh feed charge stock first contacts the composite of comparatively high activity/- low stability and subsequently the composite having comparatively low activity/high stability. In some situations, principally involving considerations of charge stock characteristics and overall heats of reaction, the composites may be reversed—i.e. low activity/high stability catalyst followed by high activity/low stability catalyst.

The naphtha boiling range feedstock, in admixture with a recycled hydrogen-rich vaporous phase, is introduced via line 7 into reaction zone 2. The hydrogen to hydrocarbon mole ratio is about 6:1, the pressure approximately 100 psig and the liquid hourly space velocity is about 1.5, based upon the total quantity of catalyst in all four reaction zones of the system. Prior to entering reaction zone 2, the combined feed is increased to a temperature such that the catalyst bed inlet temperature is about 950° F. (510° C.). The charge stock flows laterally, from the space between the inside wall of reaction zone 2 and catalyst retaining screen 8, into and through annular-form catalyst bed 10 and into centerpipe 9 from which the first zone effluent is withdrawn by way of conduit 11.

After passing through a reaction zone interheater (not illustrated), the product effluent continues through conduit 11 and is introduced thereby into reaction zone 3. The feed stream flows laterally and radially through annular-form catalyst bed 14 which is defined by catalyst retaining screen 12 and perforated centerpipe 13. Reaction product effluent passes through line 15, is increased in temperature and introduced into lowermost reaction zone 4. Reaction zone 4 also contains an annular-form catalyst bed 18 which is formed by perforated centerpipe 17 and catalyst retaining screen 16. Conduit 19 carries the product effluent from reaction zone 4 into the single reaction zone system 5, following inter-heating to once again increase the temperature to a level which provides a catalyst bed inlet temperature of about 950° F. (510° C.).

With respect to effluent conduits 11, 15 and 19, these will originate, in a commercially-designed system, from the lowermost terminus of centerpipes 9, 13 and 17, respectively. They have been shown as emanating from the side of reaction zones 2, 3 and 4 only for convenience and simplification of the drawing. This has also been done in regard to reaction zone 5, its centerpipe 21 and outlet conduit 23.

After being increased in temperature to about 950° F. (510° C.), the third reaction zone effluent in line 19 is introduced into reaction zone 5, in which it traverses annular-form catalyst bed 22 which is defined by catalyst retaining screen 20 and perforated centerpipe 21. The final product effluent is withdrawn via conduit 23 and transported thereby into heat exchange and separation facilities (not illustrated) to provide the normally liquid product and a hydrogen-rich vaporous phase. A portion of the latter is vented from the system on pressure control, the remainder being recycled to combine with the fresh feed charge stock to reaction zone 2 via line 7.

Periodically, regenerated catalyst particles from conduits 25 are introduced, through catalyst inlet ports 26 and a plurality of transfer conduits 27, generally numbering from six to sixteen, into annular-form catalyst bed 10. Catalyst particles flow via gravity therefrom, by way of a plurality of transfer conduit 28 into annular-form catalyst bed 14 which is maintained within reaction zone 3. Similarly, the catalyst particles traverse reaction zone 3 via gravity-flow and are transferred via a plurality of conduits 29 into annular-form catalyst bed 18 within reaction zone 4. Deactivated catalyst particles are removed from lowermost reaction zone 4 through a plurality of outlet ports 30 and conduits 31. These particles are introduced into a solids withdrawal and transport vessel of the type shown in U.S. Pat. No. 3,856,662, issued Dec. 24, 1974, but not illustrated in the present drawing. The withdrawn catalyst particles are transported via lift line 32 into disengaging hopper 33.

Similarly, regenerated catalyst particles are introduced through a plurality of conduits 35, catalyst inlet ports 36 and a plurality of transfer conduits 37, into annular-form catalyst bed 22 disposed within reaction zone 5. Deactivated particles are withdrawn through outlet ports 38 and conduits 39, introduced into a transport vessel (not illustrated), and transported via lift line 40 into disengaging hopper 34.

Disengaging hoppers 33 and 34 serve to separate catalyst fines and dust-like particles which are removed through conduits 41 and 42 to a suitable metals recovery facility. Deactivated catalyst particles comprising the first discrete catalytic composite entity from reaction zone 4 flow through a plurality of transfer conduits 43 into regenerating tower 6. Likewise deactivated particles of the second discrete catalytic composite entity from reaction zone 5 flow through a plurality of transfer conduits 44 into regenerating tower 6.

Emplaced within regenerating tower 6 is a segregated annular-form catalyst retention volume defined by outer catalyst retaining screen 45, inner catalyst retaining screen 46 and radially oriented catalyst retaining screens 47a and 47b. A further portion of screen 47c connects screens 47a and 47b below the bottom of inner screen 46. Radially oriented catalyst retaining screens 47a and 47b, and screen 47c act to segregate the annular form catalyst retention space into annular-form subvolumes 48 and 49. The exact volume of subvolumes 48 and 49 will of course be dependent on the total amount of catalyst in each reactor system, regeneration conditions and residence time of the catalyst within the regenerator. In the process represented in the drawing, the location of transfer conduits 43 is such that deactivated particles of the first discrete catalytic composite entity are passed into annular-form subvolume 48 while the location of transfer conduits 44 allow deactivated particles of the second discrete catalytic composite entity to pass into annular-form subvolume 49. The deactivated discrete catalytic composite entities descend through the regeneration tower as an annular form bed with each of the composite entities remaining segregated within its respective annular-form subvolumes.

To effect regeneration, a mixture of air, steam and a chlorine-containing compound are introduced by way of line 51, admixed with recycled flue gas from line 53 and introduced thereby into the upper carbon-burning-/halogenation section of regenerating tower 6. In this section, coke and other carbonaceous materials are removed and the chloride content of the discrete catalytic composite entities are adjusted to the original level. Substantially dry air is introduced via line 61 into the regenerating tower 6, the drying section, to remove substantially all the residual moisture from the catalyst particles. Flue gas combustion products are withdrawn through a centerpipe 50 defined by the inner catalyst retaining screen 46 and conduit 52. A portion thereof is diverted through line 53 to combine with the steam, chlorine-containing compound and air being introduced through line 51; dilution with flue gas in this manner is advisable in order to maintain the oxygen level in the carbon-burning section at about a maximum of 2.0%.

Dried, regenerated particles of said first discrete catalytic composite entity are removed from subvolume 48 in the regenerator 6 via transfer conduit 54 and are introduced into catalyst lift engager 55. Likewise, dried, regenerated particles of the second discrete catalytic composite entity are removed from subvolume 49 and passed to catalyst lift engager 57 via transfer conduit 56. Lift engagers 55 and 57 are of the type found in the prior art hereinbefore described. A lift gas is introduced into lift engager 55 through line 58 and carries the first discrete catalytic composite entity particles through lift line 24 to the top of stacked reactor system 1. Likewise, the lift gas introduced via line 59 into lift engager 57 transports the second discrete catalytic composite entity particles through lift line 60 to the top of reaction zone 5.

FIG. 2 is a cross sectional view of regenerating tower 6 looking downward from above and clearly depicting the configuration of outer retaining screen 45, inner retaining screen 46 and radially oriented retaining screens 47a and 47b. Said retaining screens, in conjunction with retaining screen 47c depicted in FIG. 1, act to maintain the first and second discrete catalytic composite entities segregated while still enabling use of a common regeneration tower. By keeping the discrete entities separate during the regeneration procedure, the task of isolating the discrete entities upon completion of the regeneration is obviated. Accordingly it is not necessary to employ catalysts having differing particle diameters thereby avoiding problems of nonuniform flow of catalyst through the regenerator due to mixture of particle sizes. Likewise it is unnecessary to incorporate magnetic components into catalyst supports which may potentially have adverse impact on the catalyst characteristics.

In addition, by keeping the discrete catalytic composite entities segregated, more control over the regeneration of each entity may be had. For example, the residence time of one of the entities in the regeneration zone may be adjusted to increase or decrease the halogen content of the regenerated catalytic composite entity. When the discrete catalytic composite entities are commingled during regeneration, less control is maintained over residence time of each catalytic entity. Accordingly, the invention results in a more controlled and facile regeneration obviating the necessity of employing complex catalyst separation facilities.

FIG. 3 depicts a regenerating tower internals arrangement alternative to that shown in FIG. 2. FIG. 3 is a cross sectional view of a regenerating tower looking downward from above as in FIG. 2. Located within the regeneration tower vessel wall 306 is outer catalyst retaining screen 345 and concentrically positioned inner catalyst retaining screen 346 which defines centerpipe 350. Screen 345 and screen 346 further act to define an annularform catalyst retention volume located therebetween. A third screen, catalyst retaining screen 347, is situated between outer screen 345 and inner screen 346, concentric thereto, subdividing the annular-form catalyst retention volume into annular-form subvolume 348 and annular-form subvolume 349. Each of the annular-form subvolumes will contain a different one of the discrete catalytic composite entities, the exact positioning of screen 347 being dependent on the desired size of the subvolumes and in turn the exact quantity of each catalytic composite entity along with the desired regeneration conditions.

Of course the arrangements depicted in FIGS. 2 and 3 are not the exclusive internals' configurations. Any suitable equivalent may be employed. The foregoing clearly illustrates the method of effecting the process encompassed by the present invention, and indicates the many advantages and benefits afforded through the utilization thereof. Others will become evident to those possessing the requisite skill in the catalytic conversion art.

We claim as our invention:

1. A process for the catalytic conversion of a hydrocarbonaceous charge stock wherein said charge stock is contacted with at least two discrete catalytic composite entities comprising the steps of:
    (a) contacting said charge stock with a first of said catalytic composite entities at hydrocarbon conversion conditions in a reactor system in which the first catalytic composite entity is downwardly movable via gravity flow to form a first reactor system effluent stream;
    (b) serially contacting at hydrocarbon conversion conditions said first reactor stream effluent with at least one other of said catalytic composite entities, each displaced within separate reactor systems in which said catalytic composite entities. are downwardly movable via gravity flow;
    (c) at least periodically withdrawing deactivated catalytic composite entities from the reactor systems and passing them in segregated fashion to a common regenerator through which said deactivated catalytic composite entities are downwardly movable via gravity flow;
    (d) regenerating in segregated fashion the deactivated catalytic composite entities; and,
    (e) withdrawing regenerated discrete catalytic composite entities from the regenerator in segregated fashion and at least periodically returning the regenerated discrete catalytic composite entities to their respective reactor systems.

2. The process of claim 1 further characterized in that the number of discrete catalytic composite entities employed is two.

3. The process of claim 1 further characterized in that the discrete catalytic composite entities each comprise at least one Group VIII noble metal component, composited with a refractory inorganic oxide and that the entities differ from one another as a result of differing noble metal concentrations.

4. The process of claim 1 further characterized in that the discrete catalytic composite entities comprise a halogen component and that the entities differ from one another as a result of differing halogen concentrations.

5. The process of claim 1 further characterized in that each reactor system comprises at least two reaction zones.

6. The process of claim 5 further characterized in that the reaction zones are arranged in vertical alignment.

7. The process of claim 1 further characterized in that at least one of the reactor systems comprises a single reaction zone with the remaining reactor systems comprising at least two reaction zones each.

8. The process of claim 1 further characterized in that said catalytic conversion of a hydrocarbon charge stock comprises the catalytic reforming of a naphtha charge stock, the catalytic composite entities comprise reforming catalysts, and the hydrocarbon conversion conditions comprise catalytic reforming conditions including the presence of hydrogen.

9. A process for catalytically reforming a hydrocarbon charge stock wherein said charge stock is contacted with two discrete catalytic composite entities comprising the steps of:
(a) contacting said charge stock with a first of the discrete catalytic composite entities at reforming conditions including the presence of hydrogen in a first reactor system in which the first discrete catalytic composite entity is downwardly movable via gravity flow to form a first reactor system effluent stream;
(b) contacting said first reactor effluent stream with a second of the discrete catalytic composite entities at reforming conditions including the presence of hydrogen in a second reactor system in which the second discrete catalytic composite entity is downwardly movable via gravity flow;
(c) at least periodically withdrawing deactivated first and second discrete catalytic composite entities from the first and second reactor systems respectively and passing them in segregated fashion to a common regenerator through which said deactivated first and second discrete catalytic composite entities are downwardly movable via gravity flow;
(d) regenerating in segregated fashion the deactivated first and second discrete catalytic composite entities; and,
(e) withdrawing regenerated first and second discrete catalytic composite entities from the regenerator in segregated fashion and at least periodically returning the regenerated discrete catalytic composite entities to the first and second reactor systems respectively.

10. The process of claim 9 further characterized in that said deactivated first and second discrete catalytic composite entities are regenerated by contacting the entities with oxygen, halogen and steam and thereafter drying said entities.

11. The process of claim 9 further characterized in that said first reactor system comprises a plurality of reaction zones and said first discrete catalytic composite entity is movable from one zone to the next succeeding zone via gravity flow.

12. The process of claim 9 further characterized in that said second reactor system comprises a plurality of reaction zones and said second discrete catalytic composite entity is movable from one zone to the next succeeding zone via gravity flow.

13. The process of claim 9 further characterized in that said first and second discrete catalytic composite entities each contain at least one Group VIII noble metal component and a halogen component, composited with a refractory inorganic oxide, each entity differing in activity, stability and selectivity characteristics as a result of differing noble metal concentrations.

14. The process of claim 9 further characterized in that said first and second discrete catalytic composite entities each contain a halogen component, each entity differing in activity, stability and selectivity characteristics as a result of differing halogen concentrations.

15. The process of claim 9 further characterized in that said first and second discrete catalytic composite entities each contain a Group VIII noble metal component and at least one catalytic metallic modifier, each entity differing in activity, stability and selectivity characteristics as a result of differing catalyst modifiers.

16. The process of claim 9 further characterized in that said first reactor system contains at least two individual reaction zones and said second reactor system consists of a single reaction zone.

17. The process of claim 12 further characterized in that said Group VIII noble metal component is a platinum component.

* * * * *